US012660741B2

(12) United States Patent
Shearer et al.

(10) Patent No.: US 12,660,741 B2
(45) Date of Patent: Jun. 23, 2026

(54) MODULAR SYSTEM FOR AGRICULTURE FIELD OPERATIONS

(71) Applicant: Kubota Corporation, Naniwa-ku (JP)

(72) Inventors: Scott Shearer, Fort Worth, TX (US); Andrew Klopfenstein, Fort Worth, TX (US); Christopher Tkach, Fort Worth, TX (US); Chris Dean, Fort Worth, TX (US); Todd H. Stucke, Grapevine, TX (US); Joshua M. Gattis, Fort Worth, TX (US)

(73) Assignee: Kubota Corporation, Osaka (JP)

( * ) Notice: Subject to any disclaimer, the term of this patent is extended or adjusted under 35 U.S.C. 154(b) by 396 days.

(21) Appl. No.: 18/449,616

(22) Filed: Aug. 14, 2023

(65) Prior Publication Data

US 2024/0049621 A1     Feb. 15, 2024

Related U.S. Application Data

(60) Provisional application No. 63/398,086, filed on Aug. 15, 2022.

(51) Int. Cl.
| | |
|---|---|
| *A01C 7/06* | (2006.01) |
| *A01C 15/00* | (2006.01) |
| *A01M 7/00* | (2006.01) |
| *A01M 9/00* | (2006.01) |

(52) U.S. Cl.
CPC .............. *A01C 7/06* (2013.01); *A01C 15/003* (2013.01); *A01C 15/006* (2013.01); *A01M 7/0085* (2013.01); *A01M 9/0084* (2013.01)

(58) Field of Classification Search
CPC ....... A01C 7/06; A01C 15/003; A01C 15/006; A01M 7/0085; A01M 9/0084
See application file for complete search history.

(56) References Cited

U.S. PATENT DOCUMENTS

| | | | | | |
|---|---|---|---|---|---|
| 6,148,863 | A | * | 11/2000 | Memory | ............. A01M 7/0085 137/262 |
| 8,262,004 | B2 | * | 9/2012 | Gamble, II | ........... E01C 19/203 239/176 |
| 12,318,802 | B2 | * | 6/2025 | Mäenpää | ................ B05B 9/035 |

* cited by examiner

*Primary Examiner* — Nicole Coy
(74) *Attorney, Agent, or Firm* — Schwabe Williamson & Wyatt

(57) ABSTRACT

Some embodiments may include a multi-product management system including a modular container for re-supplying partially or fully automated agricultural operations. The modular container may include a liquid-holding portion, a granular solid-holding portion, and, optionally, an add-on portion. In some embodiments, the liquid-holding portion may be formed of a plurality of liquid-holding portions. Other embodiments may be disclosed and/or claimed.

20 Claims, 9 Drawing Sheets

MODULAR SYSTEM FOR AGRICULTURE FIELD OPERATIONS

PRIORITY

This application is a non-provisional of U.S. Provisional Application No. 63/398,086 filed on Aug. 15, 2022, which is incorporated by reference herein.

TECHNICAL FIELD

The present disclosure relates to off-highway working vehicles and other working machines, and some embodiments relate to a modular system configured to be used by, or with, such vehicles.

BACKGROUND

Off-highway working vehicles or other working machines, which may operate on steep or uneven ground, may include utility vehicles, such as tractors, lawnmowers, construction vehicles, agriculture vehicles, or the like. These working machines may have transportation systems, such as wheels, treads, walking devices, crawlers, or the like, to transport the working machine from one location to another. A motorized transportation system may be powered by any power source, such as a combustion engine, an electric motor, or the like, or combinations thereof.

In addition to the transportation system, these working machines may include tools for performing a work task, such as a residential operation, commercial operation, or industrial operation. Example work tasks may include mowing, spraying, harvesting, planting, digging, mining, leveling, or the like. These tools may also be referred to as implements, and may include:

Passive implements such as a plow that is pulled by a tractor, a trailer with a non-motorized transportation system, or the like; and Motorized implements, such as a powered hitch to position a plow, a mower, a digger, a lawn edger, or the like.

Various components of these working machines (e.g., motorized devices of the transportation system and/or a motorized implement), may be configured to operate autonomously (e.g., fully autonomously or semi-autonomously). A robotic lawn mower is one example of a working machine that may operate fully autonomously. A tractor having an auto-steering system interfacing with the steering wheel (or steering wheel column) is one example of a semi-autonomous working vehicle (because an operator may manually steer the vehicle using the steering wheel).

DETAILED DESCRIPTION

Figure 1:
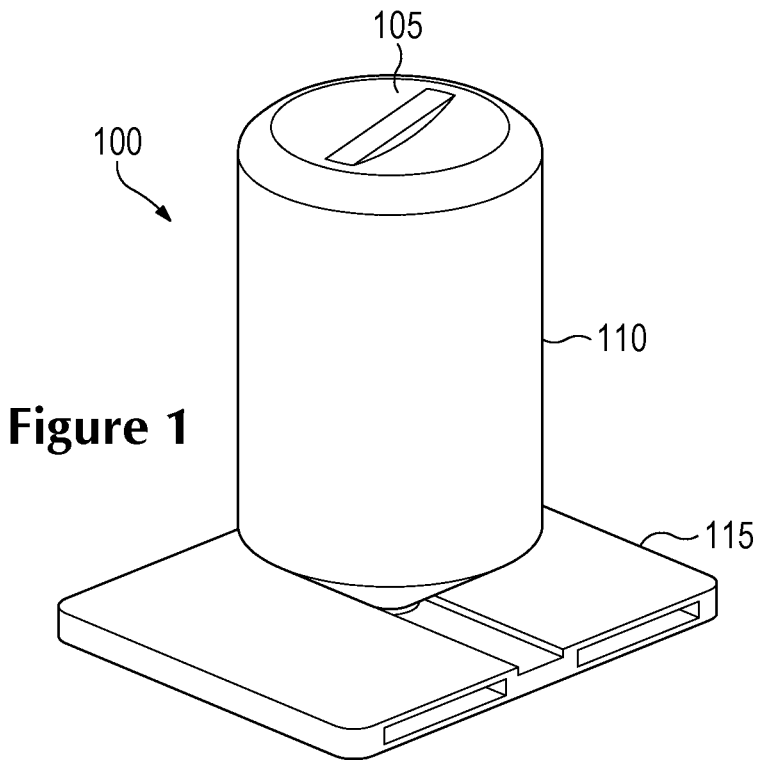
FIG. 1 illustrates an example of a solid-holding portion of a modular container, in accordance with various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Various embodiments include a system for tending automated field machinery to support agricultural field operations, e.g., tillage, seeding, spraying, or other field operations now known or later developed. Automation of the tending processing may support the transition to fully autonomous field production systems (e.g., in broad acre crops or specialty crops).

In various embodiments, the system may include or relate to one or more of:

A modular container sized for seed, fertilizer, spray material, diesel fuel, diesel exhaust fluid (DEF), and/or some other additional or alternative liquid and/or granular product;

A unitized returnable container to enhance logistics related to automation or semi-automation of one or more field operations (e.g., tillage, fertilizer application, spray application, seeding/planting, harvest operations, etc.);

Automated or semi-automated modular container transfer between a tender truck (which may be referred to herein as a "TT") and a satellite transfer vehicle (which may be referred to herein as a "STV"), and/or a STV and a small equipment platform (which may be referred to herein as a "SEP"); and Processes and controls for locating and attaching/unattaching a modular storage container from field machinery to promote continuous or semi-continuous field operations.

It will be noted that the terms TT, STV, and SEP and used herein for the sake of brevity and conciseness in discussing embodiments herein. Similarly, certain elements herein may be referred to with a specific name or designation. However, the specific names used may be different based on the context, the industry, the specific application, etc. The the descriptions of embodiments herein may still be applicable regardless of use of different names for either the implements (TT, STV, SEP) or elements of Figures herein.

Various embodiments may include or relate to a container and interface for tending and supporting inputs and/or outputs of small equipment platform components (e.g., fuel, fertilizer, crop protectants, seed, harvested commodities, etc.). These containers and interfaces may improve or optimize hopper/tank capacity and/or refill/unload times.

Various embodiments may include processes and controls for locating and attaching to an interface (e.g., a refill connection) on small versus large platform field equipment. Various embodiments may include processes, controls, and sensors for sensing and controlling refill quantities and frequencies for small and large autonomous fleets.

Various embodiments may address logistics challenges with current systems and/or enhance crop production inputs. Some embodiments may include or relate to one or more of the following:

Service more equipment than some known systems and/or support the shift to SEPs; Deliver correct quantities/varieties to individual SEPs based on the cropping plan for individual fields;

Support dynamic input changes at a moment's notice; and

Allow farmers to not take possession of inputs until they go in the ground or are applied to crop.

Various embodiments may include the following equipment, and may support full autonomous operation of the complete SEP complement:

TT—A TT may stop at a resupply point and stock crop production inputs to provide 150 acres of coverage via transfer to or from a STV. In some embodiments, the transfer between a TT and an STV may be performed via an implement such as an auto-connect boom and/or some other transfer-related implement.

STV—An STV may be configured to ferry crop production inputs from a TT to a SEP in the field. Similarly to the transfer between the TT and the STV, in some embodiments the STV may be configured to transfer these input supplies via an auto-connect boom 1327 (FIG. 13) and/or some other transfer-related implement. In some embodiments, the auto-connect boom may be an element of the STV (e.g., the STV may be configured to transfer material between the TT and the STV via an auto-connect boom of the STV, and then from the STV to the SEP via the same or a different auto-connect boom of the STV. In some embodiments, the one or both of the auto-connect booms 1326 or 1328 may be an element of a different piece of equipment (e.g., of the TT and/or of the SEP).

SEP—The SEP may receive inputs such as a modular container from a STV via an implement such as an auto-connect boom or some other transfer implement. Production inputs included in the modular container may include liquid inputs such as diesel fuel, DEF, fertilizer, carrier, pesticides, etc. Production inputs included in the modular container may additionally/alternatively include a solid and/or granular material such as seed, fertilizer, etc.

Embodiments herein may support transitioning from manned to supervised and then fully autonomous tending of small platforms. It will be noted that the below embodiments are provided as non-limiting examples. Additionally, it will be noted that such examples are described with respect to interaction between a STV and a SEP. However, in other embodiments similar interaction (e.g., connection, material transfer, disconnection, etc.) between a TT and a STV may occur and may likewise be performed in a manual, supervised autonomous, or autonomous manner.

Embodiments that are manually operated (e.g., operated at the control or under the supervision of one or more human operators that is either co-located with a piece of equipment or controlling such a piece of equipment from a different location) may include one or more of:

Verification of manual control of a STV that is interfacing with (e.g., coupled to and/or transferring a modular box to or from) a SEP. The operator(s) may, for example, monitor one or both of the SEP and the STV to verify sensor data and/or feedback/alerts;

Verification of transfer of liquid and/or granular products from a STV to a SEP. The operator(s) may monitor the system to ensure minimal or no spill or loss of transferred materials; and Verification of separation of the STV and the SEP under manual control. The operator(s) may monitor the system to verify disconnect and closure of connectors.

Supervised autonomy embodiments (which may also be referred to as "semi-autonomous") may include action by one or more control systems. The control systems may be a control system of a STV, a control system of a SEP, and/or some additional or alternative control system. The control system(s) may provide some form of feedback to one or more operators, and the one or more operators may then take some form of remedial or assistive action. The actions of the one or more control systems may include one or more of:

Monitoring the connection process between a STV and a SEP. The control system(s) may provide feedback such as alerts. In some embodiments, the control system(s) may initiate an abort sequences if an error occurs related to the connection process;

Verification of transfer of liquid and/or granular materials from an STV to a SEP. The control system(s) may be configured to detect a full SEP to ensure minimal/low/ no spill or loss of transferred materials; and/or Verification of disconnect between an STV and a SEP. In some embodiments, the control system(s) may generate an alert if either operation fails.

Full autonomy embodiments may relate to actions that are carried out by one or more control systems (e.g., of a SEP, a STV, and/or some additional or alternative control system). In a full autonomy embodiment, a human operator may not be involved in the action. Full autonomy embodiments may include one or more of:

Observation of connection between a SEP and a STV. The control system(s) may autonomously verify the connection;

Observation of the transfer of liquid and/or granular material from a STV to a SEP. The control system(s) may autonomously verify fill quantities and or verify the occurrence of a spill and/or other loss; and/or Observation of disconnect between the STV and the SEP. The control system(s) may autonomously verify that disconnect has occurred without error, generate an alert based on the occurrence of spills and/or losses, and/or perform some remedial action related to such a spill or loss.

In various embodiments, the inputs described above may be transferred from a TT to an STV, and then from an STV to a SEP, using a modular tending system container. Such a container may be referred to herein as a "modular container" or an "eBox." The container may include at least two sections.

A first section may be a solid-holding portion. The solid-holding portion may be configured to contain, and subsequently distribute, a solid material. In some embodiments, the solid material may be a granular material such as fertilizer, seed, grain, and/or some other type of granular material.

FIG. 1 depicts an example of a solid-holding portion 100 of a modular container, in accordance with various embodiments. The solid-holding portion 100 may include a body 110 and a lid 105. In some embodiments, the body 110 may be generally cylindrical, as shown in FIG. 1. The body 110 may generally define an enclosed cavity therein (not shown in FIG. 1) in which the solid material may be placed for transport. Additionally, as shown, the body 110 may have a tapered or frusto-conical shape as shown in FIG. 1 which may serve to concentrate the flow of the solid material from the body 110 out of a port at a bottom portion of the solid-holding portion 100. Specifically, the body 110 may have a port that connects with a base 115 of the modular container. Such a port is not shown in FIG. 1 due to the connection of the solid-holding portion 100 with the base 115 in FIG. 1.

It will be recognized, however, that the cylindrical and frusto-conical shapes are intended only as one example shape, and other embodiments may have a triangular, oval, square, rectangular, etc. cross-section. Similarly, the tapered portion of the body 110 may be frusto-pyramidal or some other shape.

In some embodiments, the granular solids in the solid-holding portion may flow from the solid-holding portion due to gravity (e.g., passively) when the above-mentioned port is opened. In other embodiments, the solid-holding portion may include one or more mechanical mechanisms, hydraulic mechanisms, etc. which may actively cause the solids to flow from the solid-holding portion. For example, the solid-holding portion may include a hydraulic element to push the solid material, a suction-type element to help "pull" the solid material, etc. In some embodiments, the body 110 may include an agitator placed therein that may move in some form to reduce or minimize the chance of the solid material "sticking," either to itself or to a part of the solid-holding portion.

The solid-holding portion 100 may include a lid 105 as shown in FIG. 1 that is removably coupleable to the body 110. In some embodiments, the lid 105 may be threaded such that it is configured to "screw" into the body 110. In other embodiments, the body 110 may be threaded to "screw" into the lid 105. In some embodiments, the lid 105 may be hinged and/or have some other type of configuration such that it may be securely, but removeably, coupled with the body 110. In embodiments, the lid 105 may be removed from the body 110 such that the solid-holding portion 100 may be filled or re-filled with the solid material. The lid 105 may then be securely fastened to the body 110 to contain the solid material therein for transport and/or use.

A second section of the modular container is a liquid-holding portion. The liquid-holding portion may be configured to hold, transport, disperse, apply, and or use a liquid material. Such a liquid material may be, for example, a liquid input described above such as diesel fuel, DEF, fertilizer, carrier, pesticides, etc., and/or some other liquid input.

Figure 2:
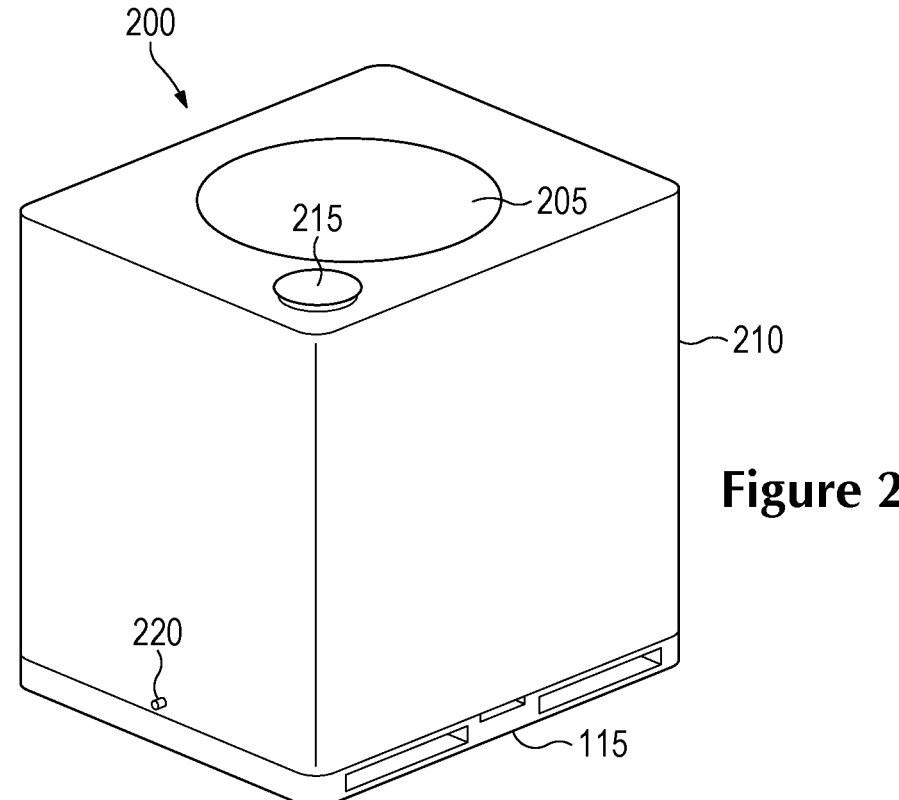
FIG. 2 illustrates an example of a liquid-holding portion of a modular container, in accordance with various embodiments.

FIG. 2 depicts an example of a liquid-holding portion 200, in accordance with various embodiments. Similarly to the solid-holding portion 100, the liquid-holding portion 200 may include a body 210 that defines a closed cavity in which liquid may be placed for transport and/or use. Specifically, the body 210 may include a fill port with a removable plug 215 of some sort. The plug 215 may be, for example, a stopper-type plug, a latchable plug, a screw-type plug or some other type of plug. The plug 215 may be removable by an operator such that the body 210 may be filled with one or more of the above-described liquid inputs. The plug 215 may then be re-affixed to the body 210 to securely "close" the fill port.

In some embodiments, the body 210 may have a pressure release valve 220 positioned therein. The pressure release valve 220 may be configured to allow the liquid material to exit the body 210 in the situation where the liquid-holding portion 200 is overfilled, if the liquid material starts expanding subsequent to the fill port being closed, or if some form of chemical reaction occurs that cause pressure to build up inside of the body 210.

The body 210 may be attached to the base 115 as shown in FIG. 2. Similarly to the solid-holding portion 100, the body 210 and the base 115 may include one or more ports that are selectively operable to allow liquid to flow through the port from the body 210. Such a flow may be used, for example, to disperse the liquid during an operation such as tillage, fertilizing, or some other operation. Similarly to above, such dispersion may be passive (e.g., gravity based), or may be based on an active mechanism (e.g., a hydraulic mechanism, a suction-type mechanism, or some other mechanism). In some embodiments, the body 210 may include an agitator such as that described above that may constantly, periodically, or selectively move to agitate the liquid. Such an agitator may be desirable to prevent, e.g., congealing of the liquid.

Figure 3:
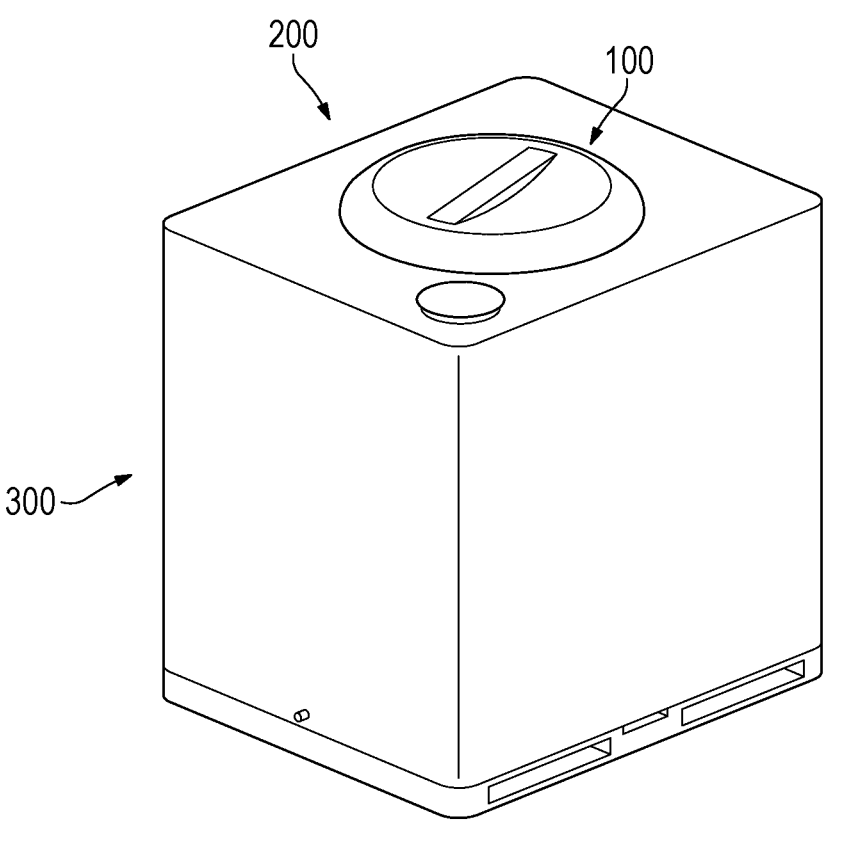
FIG. 3 illustrates an example of a modular container, in accordance with various embodiments.

The body 210 may additionally include a cavity 205 as shown. The cavity 205 may be configured such that the solid-holding portion 100 may be positioned in the cavity 205 of the liquid holding portion 200. FIG. 3 shows such a configuration of a modular container 300 wherein a solid-holding portion 100 is joined with a liquid-holding portion 200. In some embodiments, there may be a securing or latching mechanism that may secure the solid-holding portion 100 within the cavity. For example, the body 110 of the solid-holding portion 100, and the cavity 205, may be threaded such that the solid-holding portion 100 may screw into the liquid-holding portion. In other embodiments, there may be one or more additional or alternative mechanisms such as a latching cross-bar attached to the body 210 that goes over the lid 105, a latch at the bottom of the cavity 205 (which may or may not be an element of the port through which the solid material is configured to flow), latches on the lid 105, an additional covering lid that covers the top of the modular container 300, and/or some other type of mechanism.

Figure 4:
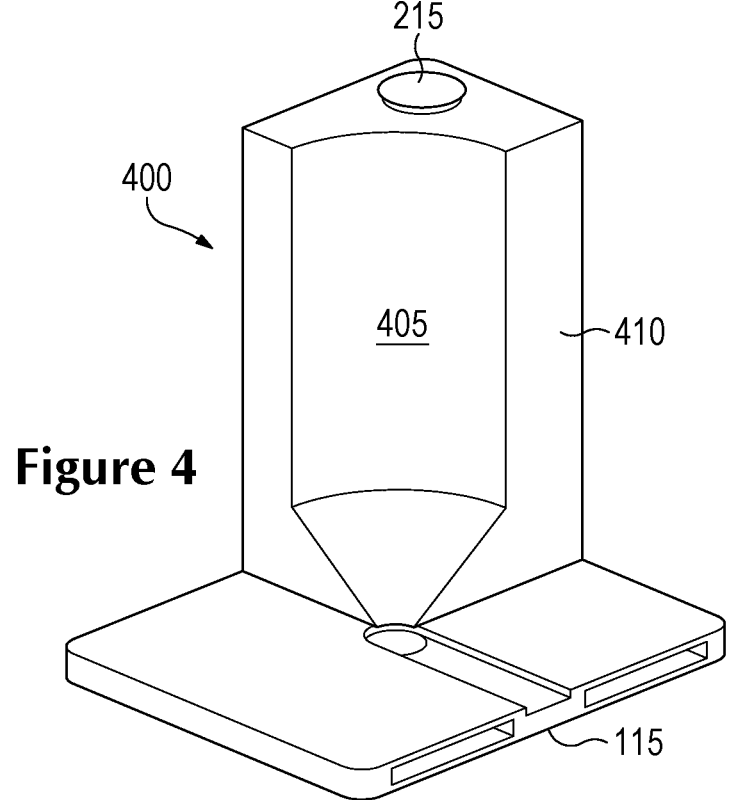
FIG. 4 illustrates an alternative example of a liquid-holding portion of a modular container, in accordance with various embodiments.

FIG. 4 illustrates an alternative example of a liquid-holding portion 400 of a modular container, in accordance with various embodiments. As may be recognized by comparison with the liquid-holding portion 200 of FIG. 2, the liquid-holding portion 400 may be referred to as a "quarter-portion." The liquid-holding portion may include a body 410, which may be similar to body 210, in that it may form a sealed cavity in which a liquid input may be placed as described above for transport, dispersal, etc. As may be seen in FIG. 4, the body 410 may define at least a portion of a cavity 405, which may be similar to a portion of cavity 205. Specifically, it will be understood that if four of the liquid-holding portions 400 are placed on a same base in an orientation such that the cavity 405 is on the interior of the resultant structure, then the resultant structure may have a form that is generally similar to that of liquid-holding portion 200.

Figures 5, 6, 7:
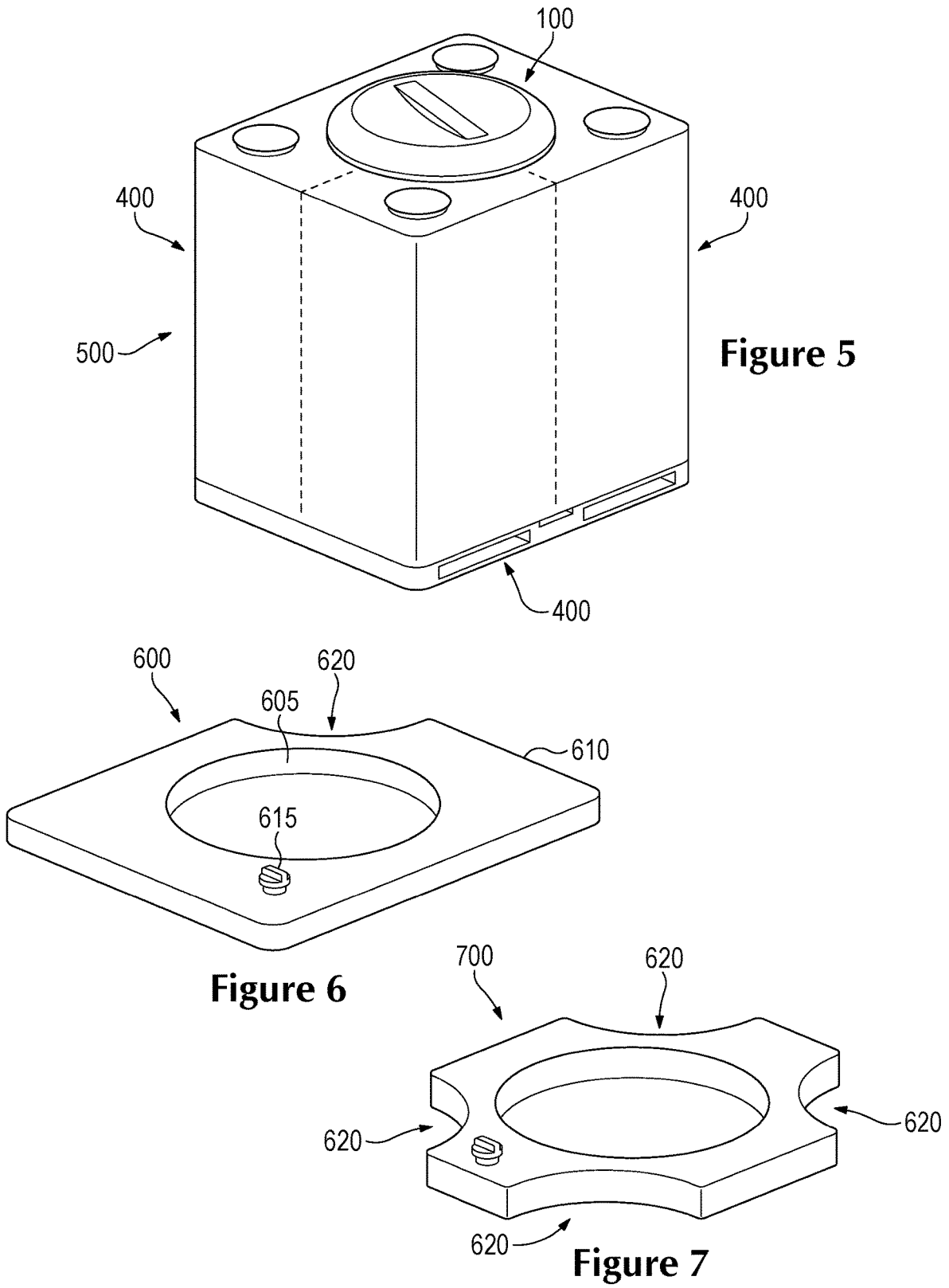
FIG. 5 illustrates an alternative example of a modular container, in accordance with various embodiments.
FIG. 6 illustrates an example of an add-on portion of a modular container, in accordance with various embodiments.
FIG. 7 illustrates an alternative example of an add-on portion of a modular container, in accordance with various embodiments.

FIG. 5 depicts an example of a modular container 500 that may be formed of a plurality of liquid-holding portions 400. The boundaries of the different liquid-holding portions 400 are indicated by the dashed lines overlaid on top of the modular container 500. It will be understood that such lines are in FIG. 5 for the purpose of discussion, and in some embodiments, there may be no such differentiating visual indicator between the different liquid-holding portions 400. As may be seen, the various cavities 405 may be aligned as described above such that a solid-holding portion 100 may be positioned therein. In some embodiments, the modular container 500 may be desirable in situations where multiple different liquids may be used (e.g., different kinds of fertilizers, a fertilizer and a weed-killer, or some other combination) for a specific application.

In some embodiments, it may be desirable to include an add-on portion that is configured to attach to a modular container such as modular containers 300 or 500 (or some other modular container). In some embodiments, the add-on portion may be configured to affix to the top of the modular container so that it doesn't change the footprint of the modular container.

FIG. 6 illustrates an example of an add-on portion 600 of a modular container, in accordance with various embodiments. The add-on portion 600 may include a body 610 that defines an enclosed cavity in which an input material may be placed as described above. In some embodiments the material may be a solid material or a liquid material as described above. The body 610 may include a port on an underside of the body 610 (not shown based on the perspective) that allows the input material to exit the add-on portion as will be described below. The input material may be placed into the body 610 via a fill port that is sealed with a plug 615. The plug may be similar to, and/or serve a similar function to, lid 105, plug 215, and/or some other type of plug or sealing mechanism.

The add-on portion 600 may include a cavity 605 and a cut-away portion 620. As is shown in greater detail in FIG. 8, the cavity 605 and the cut-away portion 620 may be for the purpose of allowing the add-on portion 600 to be placed atop a modular container such as modular container 300 without blocking operator access to a lid 105 of a solid-holding portion or a plug 215 of a liquid-holding portion 200.

FIG. 7 depicts an alternative example of an add-on portion 700. The add-on portion 700 may be generally similar to add-on portion 600. However, as may be seen in FIG. 7, the add-on portion 700 may have a plurality of cut-away portions 620. Similarly to the add-on portion 600, the cut-away portions 620 may be for the purpose of not preventing access to a plug 215 of a modular container such as modular container 500.

Figure 8:
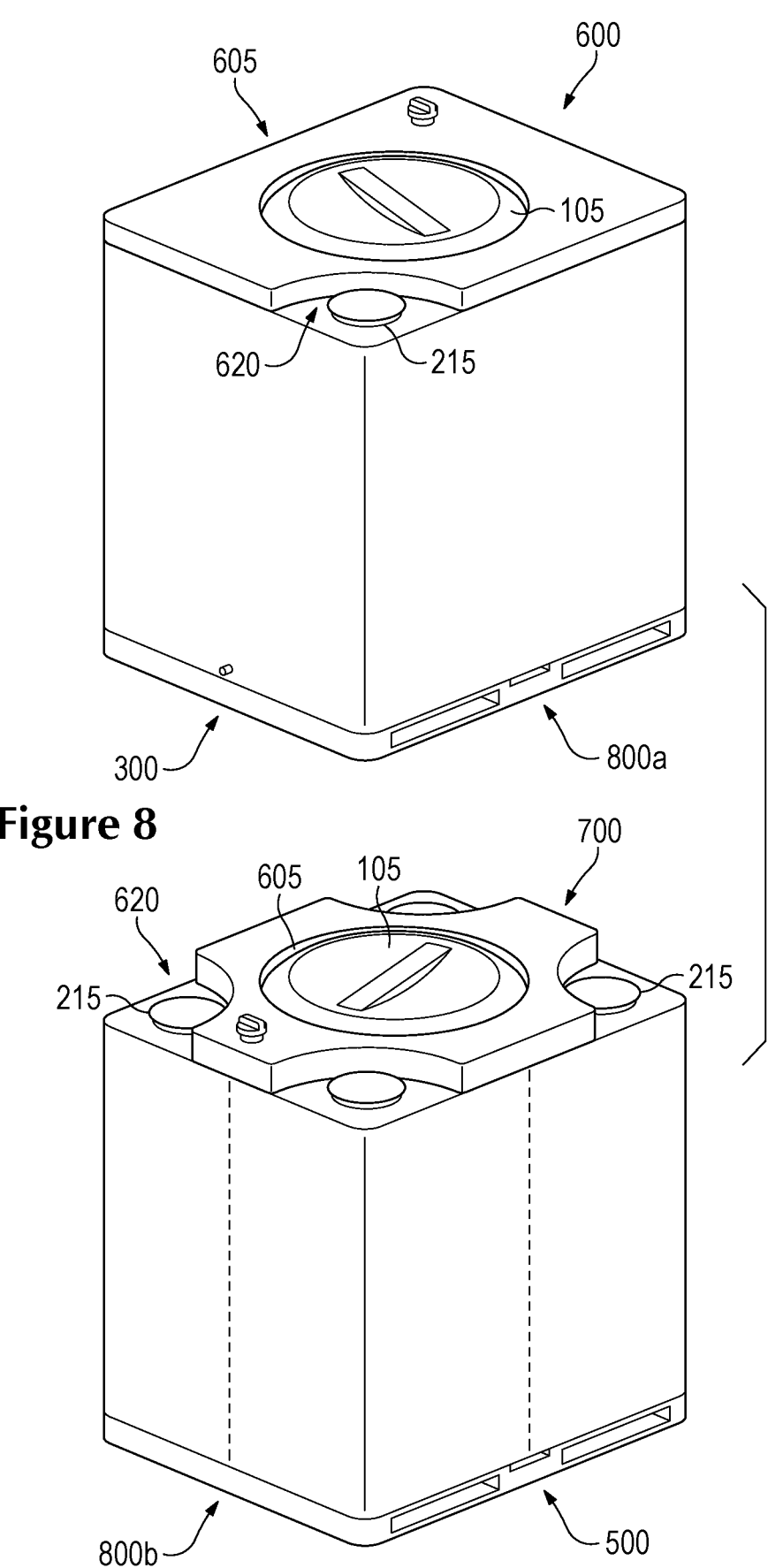
FIG. 8 illustrates two alternative examples of modular containers, in accordance with various embodiments.

FIG. 8 depicts examples of modular containers 800a and 800b that include an add-on portion. Modular container 800a includes modular container 300 with an add-on portion 600 positioned thereon. As previously discussed, the cut-away portion 620 of the add-on portion 600 may still allow for operator access to plug 215. Similarly, the cavity 605 may allow for operator access to the lid 105.

Modular container 800b includes modular container 500 with add-on portion 700 positioned thereon. As previously discussed, the cut-away portions 620 of the add-on portion 600 may still allow for operator access to plugs 215 of respective ones of the liquid-holding portions 400. Similarly, the cavity 605 may allow for operator access to lid 105.

FIGS. 9-12 depict various views of a modular structure 900. Starting with FIG. 9, the modular structure 900 may include a modular container 930, which may be generally similar to modular container 800a. Specifically, the modular container 930 may include an add-on portion 920, which may be generally similar to add-on portion 600. Similarly, the modular container 930 may include a liquid-holding portion 925, which may be generally similar to liquid-holding portion 200.

The modular container 930 may be coupled with an attachment structure 915. In some embodiments, the attachment structure 915 may be an element of the modular container 930 itself. For example, the attachment structure 915, or one or more elements thereof, may be an element of or otherwise affixed to base 115. In other embodiments, the attachment structure 915 or one or more elements of the attachment structure 915 may be an element of a SEP as is described below with respect to FIG. 13. As such, the modular container 930 may be separate from the attachment structure 915, but configured to mate with the attachment structure 915 when the modular container 930 is transferred from a STV to a SEP.

The attachment structure 915 may include a liquid transfer port 910 that is configured to allow liquid to flow from the liquid-holding portion 925. In some embodiments, the liquid transfer port 910 may itself be a nozzle that is configured to spray or otherwise disperse the liquid from the liquid-holding portion 925. In other embodiments, the liquid transfer port 910 may be coupleable with an element such as a tube, a hose, or some other element that may allow the liquid input to flow from the liquid-holding portion 925 to such a nozzle (or other element).

Figure 9:
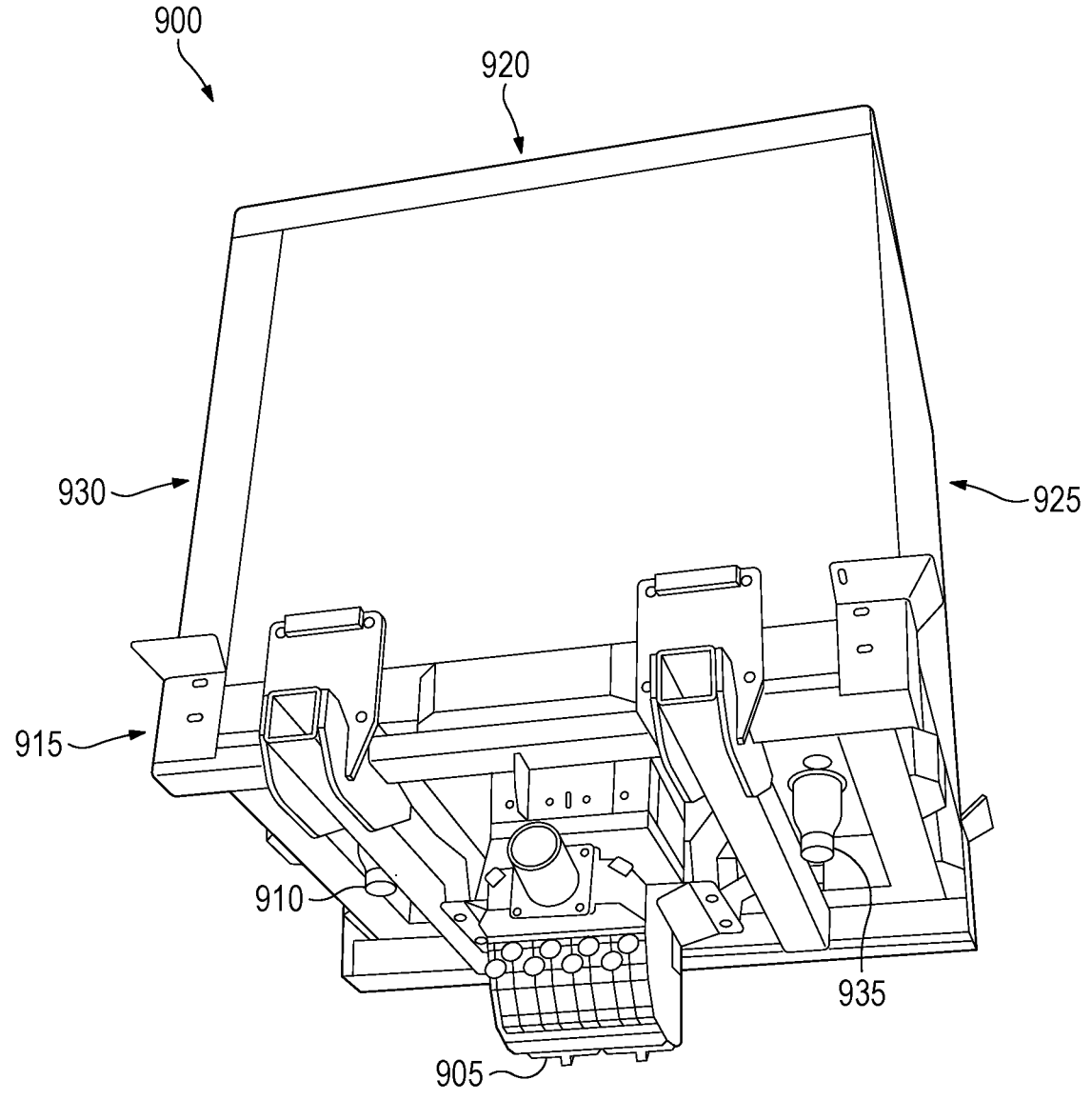
FIG. 9 illustrates an example bottom perspective view of a modular structure that includes a modular container, in accordance with various embodiments.

The attachment structure 915 may further include a solid transfer port 905. The solid transfer port 905 may, in some embodiments, be a relatively uncomplicated port that allows a granular solid to flow through it. In other embodiments (and as shown in FIG. 9), the solid transfer port 905 may include some form of a mechanism that may help agitate or otherwise separate the input solid to try to prevent clumping and/or to help draw the input solids from the solid-holding portion. Similarly to the transfer port 910, in some embodiments the solid transfer port 905 may be configured to spread, disperse, or otherwise deploy the input solids (e.g., to spread fertilizer as the SEP traverses a field). In other embodiments, the solid transfer port 905 may be configured to provide the input solids to another structure (e.g., a hose, a tube, a conveyor, etc.) that may convey the input solids to such a dispersal, spreading, or deploying mechanism.

The attachment structure 915 may further include an additional liquid transfer port 935. The liquid transfer port 935 may be of the same type or a different type of port as liquid transfer port 910. In some embodiments, the liquid transfer port 935 may be coupled with the add-on portion 920, for example via some form of tubing or other connective channel either through (as in FIGS. 9-12) or on the outside of the liquid-holding portion 925 and configured to allow liquid to flow from the add-on portion 920 to the liquid transfer port 935.

Figure 10:
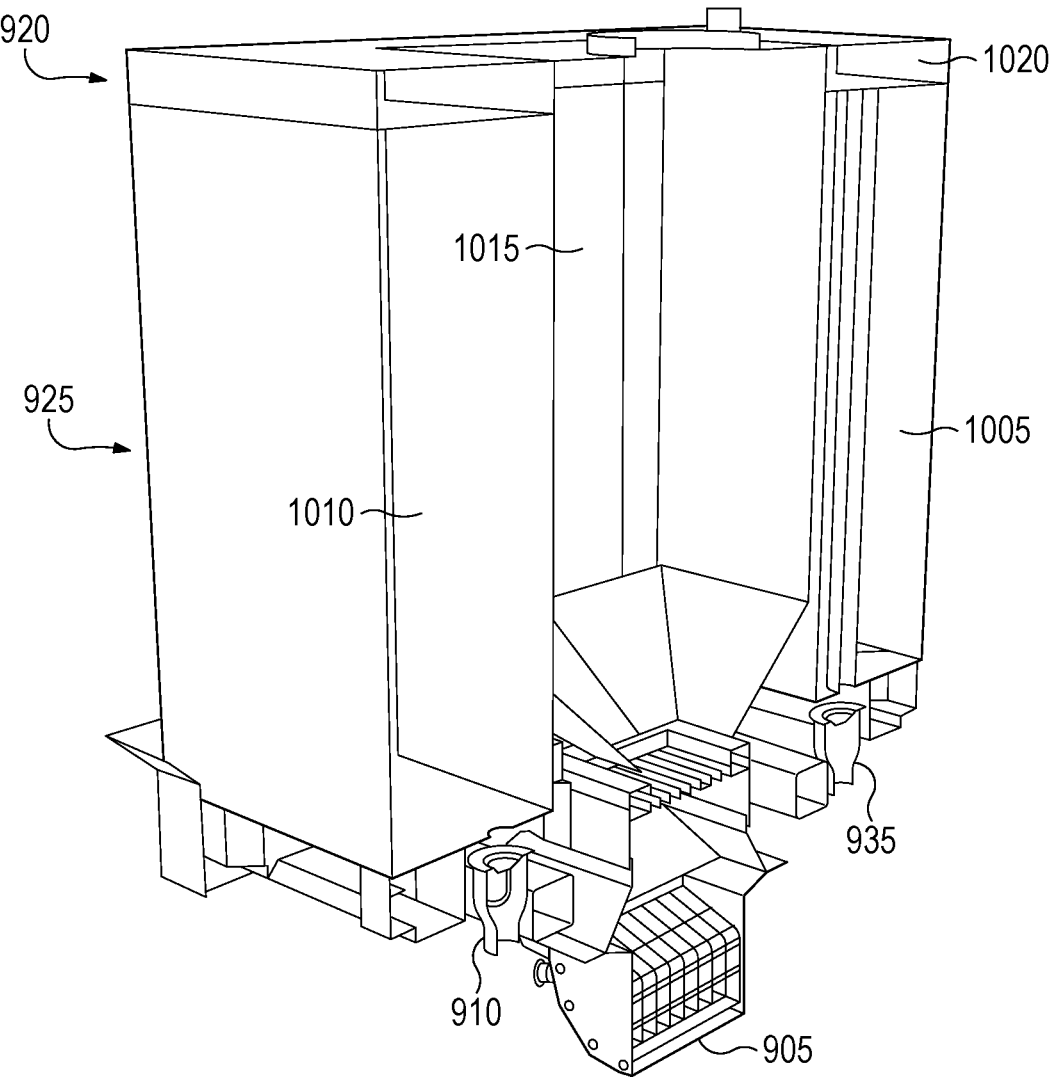
FIG. 10 illustrates an example cutaway-view of the modular structure of FIG. 9, in accordance with various embodiments.

FIG. 10 depicts a cutaway view of the modular structure 900 of FIG. 9. As may be seen in FIG. 10, rather than a round cavity (e.g., cavity 205), the liquid-holding portion 925 and the add-on portion 920 may have a generally square-shaped cavity 1015 in which a solid-holding portion (not shown in FIG. 10 for the sake of showing the various features of the Figure) may be positioned.

Additionally, FIG. 10 depicts the hollow volume 1010 of the liquid-holding portion 925 in which the liquid input may be stored. Similarly, the add-on portion 920 includes a hollow volume 1020 in which a different or the same liquid input may be stored in the add-on portion.

In addition, FIG. 10 depicts a channel 1005 that couples the hollow volume 1020 of the add-on portion 920 with the transfer port 935, as described above. As may be seen, the channel 1005 may be positioned within the hollow volume 1010 of the liquid-holding portion, however in other embodiments the channel 1005 may be positioned at least partially on the outside of the liquid holding portion 925. In some embodiments, rather than a relatively straight channel 1005, in some embodiments the channel 1005 may be formed of a flexible tubing and/or some other type of connective element.

Figure 11:
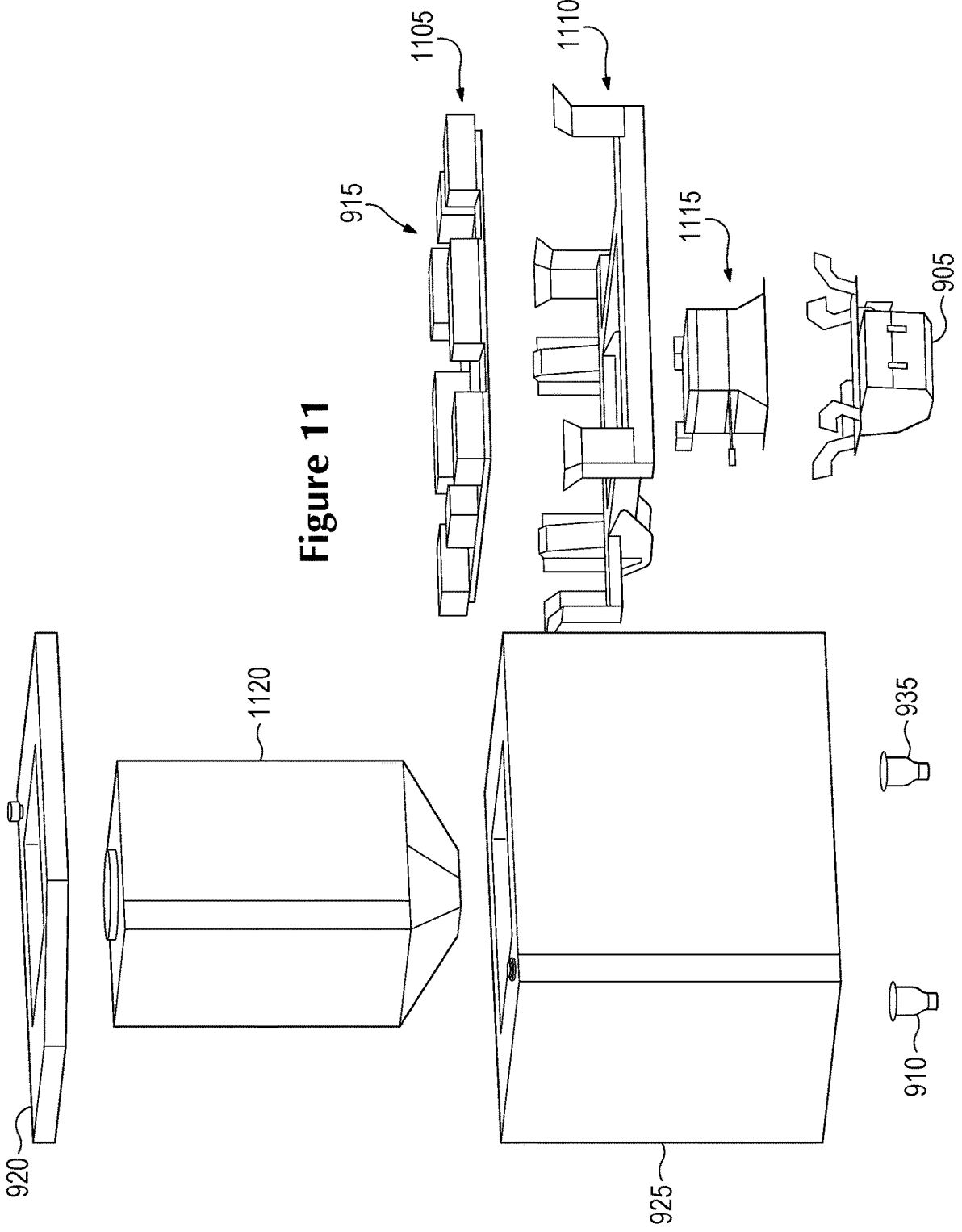
FIG. 11 illustrates an example exploded view of the modular structure of FIG. 9, in accordance with various embodiments.

FIG. 11 depicts an exploded view of the modular structure 900. For example, FIG. 11 depicts a solid-holding portion 1120, which may be generally similar to solid-holding portion 100. However, the solid-holding portion 1120 may have a generally square-shaped cross section that is placeable within cavity 1015.

Details of the attachment structure 915 may also be seen in FIG. 9. Specifically, the attachment structure 915 may include modular container supports 1105, a modular container seating mechanism 1110, an internal solids transfer portion 1115, and a solid transfer port 905.

As may be seen in other ones of FIGS. 9-12, the modular container supports 1105 may be supports upon which the modular container 930 may be placed. In some embodiments, the supports 1105 may be formed of a at least slightly flexible material such as foam or rubber. Such a material may provide cushioning to the modular container while the SEP navigates a field, thereby extending the life of the container. Additionally, the at least slightly flexible material may mitigate any shock that may occur from the modular container 930 being placed on a SEP.

Figure 12:
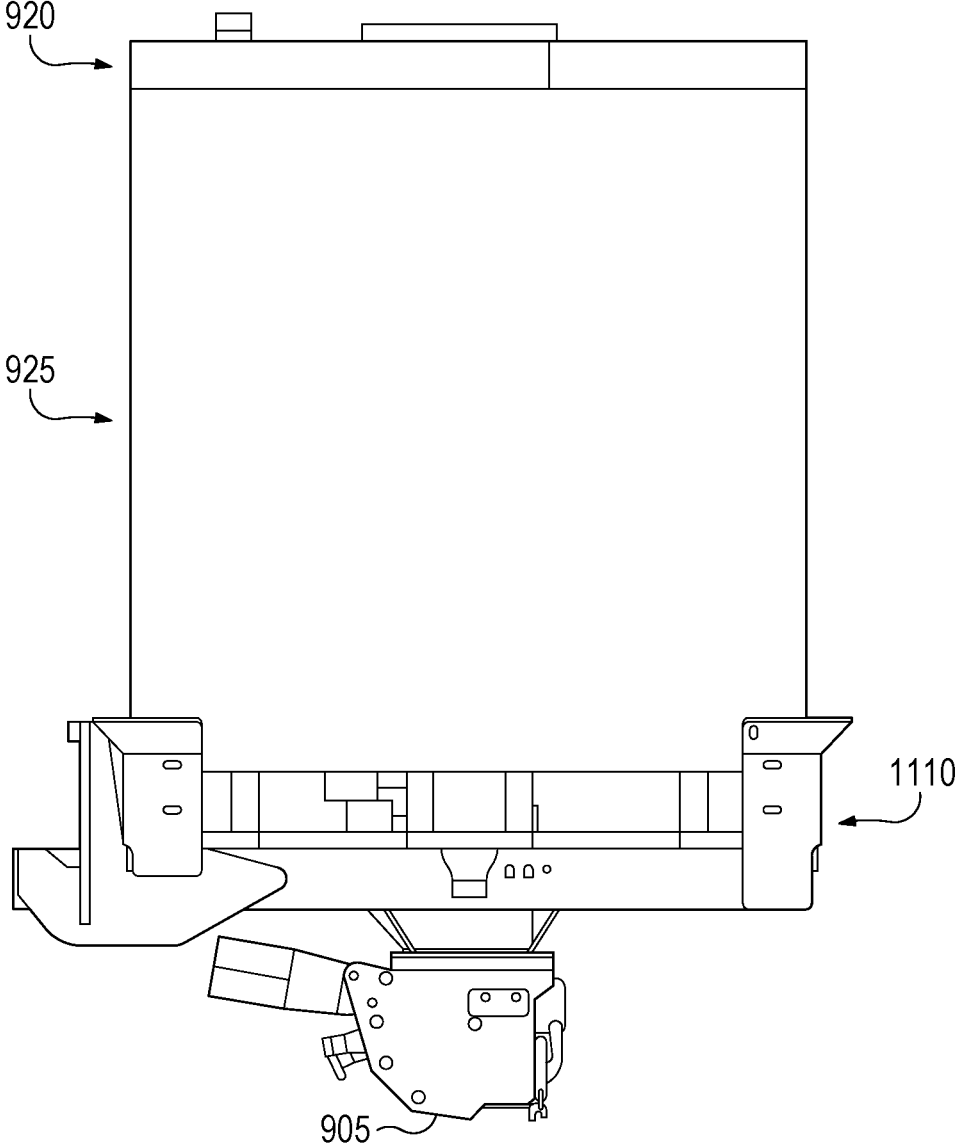
FIG. 12 illustrates an example side view of the modular structure of FIG. 9, in accordance with various embodiments.

The modular container seating mechanism 1110 may include a plurality of flared or flanged structures that may help guide or seat the modular container 930 on the modular container supports 1105. In some embodiments, the modular container seating mechanism may extend at least slightly up a side of the modular container 930, as shown in FIG. 12, thereby holding the modular container 930 in place once the modular container 930 is placed in the seating mechanism 1110. In some embodiments, one or more elements of the seating mechanism may include one or more holes, as shown, that may allow for placement of a securing element such as a screw, a cord, a ziptie, etc. that may further help hold the modular container 930 in place within the seating mechanism 1110.

The internal solids transfer portion 1115 may be configured to mate with a port on the solid-holding portion 1120 as described with respect to FIG. 1, and help guide the granular solid input material from the solid-holding portion 1120 to the solid transfer port 905. In some embodiments, such guidance may be passive (e.g., gravity-fed) while in other embodiments the internal solids transfer portion 1115 may include one or more active elements to help "pull" the granular material, agitate the granular material, or otherwise facilitate transfer of the granular solids from the solid-holding portion 1120 to the solid transfer port 905.

Generally, the modular containers described above, and or pieces thereof, may be formed of a material such as stainless steel, polymers, and/or some other similar material. For example, in some embodiments the polymer may be or include polyethylene, cross-linked polyethylene (PEX), high-density polyethylene (HDPE), low-density polyethylene (LDPE), linear low-density polyethylene (LLDPE), and/or some other similar material. It will be recognized that the material chosen may be selected based on a variety of factors such as durability (for example, a material that will not degrade due to repeated exposure to sun or mechanical shock from transport and/or use in an agricultural application), weight, and chemical reactivity (e.g., when holding a chemical such as a fertilizer or other material).

As mentioned above, the various elements of the modular containers (e.g., the add-on portions, the liquid-holding portions, the solid-holding portions, etc.) are depicted with as either having a generally square cross-section (e.g., as is shown in the cross section of the liquid-holding portion 925 or the solid-holding portion 1120) or a generally circular cross-section (e.g., as is shown with respect to solid-holding portion 100). However, it will be recognized that the specific size or shape of the various elements of a modular container and/or the attachment structure may be different in different embodiments. Additionally, although only a "whole" liquid-holding portion 200 and a "quarter-size" liquid holding portion 400 are shown in the Figures, it will be understood that these different sizes are intended as examples, and other proportions may be used in different embodiments. For example, some embodiments may use two "half-size" liquid-holding portions, a "half-size" and two "quarter-size" liquid-holding portions, three "third-size" liquid-holding portions, etc. Similarly, the solid-holding portion and/or the add-on portion may be similarly sub-divided, and such sub-divisions may be based on the application or use case to which the resultant modular container will be put.

In some embodiments, the specific sizes or dimensions of various elements of the modular containers and/or attachment structure may be based on the use to which the modular container is related. Generally, it may be desirable in some embodiments for the inputs in the solid-holding portion(s), the inputs in the liquid-holding portion(s), and the inputs in the add-on portion(s) to be used up (e.g., run out) at approximately the same time. As such, the flow rates of the various output ports (e.g., ports 910, 935, and 905) and the volumes of the various solid-holding portion(s), liquid-holding portion(s), and add-on portion(s) may be selected to accomplish this goal.

Tables 1 and 2 show one example use case related to use of a modular container in tillage. The modular container in question may be similar to, for example, modular container 300. Specifically, Table 1 depicts various input parameters that may be set set (e.g., manually by an operator, semi-autonomously by an operator and some form of control algorithm, or autonomously by the control algorithm), and Table 2 depicts various capacity-related parameters of the modular container.

TABLE 1

| Input Parameters - Tillage | | |
| --- | --- | --- |
| Rated Power | 115.0 | Horsepower (hp) |
| Ground Speed | 5.5 | Miles per Hour (mi/h) |
| Engine Load - Tillage | 90.0 | Percent (%) |
| Engine Load - Idle | 20.0% | |
| Fuel Efficiency | 20.0 | hp Hours per Gallon (hph/gal) |
| DEF Rate | 2.0% | |
| Area Covered Per Refill | 100.0 | acres |
| Pass Width | 10.0 | feet |
| Field Efficiency | 80.0% | |

TABLE 2

| Modular Container Capacity - Tillage | | |
| --- | --- | --- |
| Tending Interval | 67,500 | Seconds (s) |
| Diesel Amount | 60.59 | Gallons (gal) |
| DEF Amount | 1.21 | gal |
| Total Volume | 61.80 | gal |
| Total Weight/Mass | 441.18 | pounds (lb) |
| Modular Container Height | 12.11 | inches (in) |

In operation, an algorithm may accept one or more of the examples inputs from Table 1, and/or some other additional or alternative inputs. Based on the inputs, the algorithm may then be configured to identify a desirable capacity of the modular container such as is shown in Table 2. As the operator alters the inputs, the algorithm may update the values of Table 2. In some embodiments, a plurality of modular containers may already be selectable, and the plurality of modular containers may have different capacity-related parameters.

Based on the parameters of Table 2, the "best-fit" modular container of the plurality of modular containers may be selected. The best-fit modular container may be considered to be the modular container with one or more parameters that most closely match the parameters of Table 2. In some embodiments, certain ones of the various capacity-related parameters may be weighted in some way so that the consideration of a "best-fit" modular container takes those parameters into account more higher priority than other capacity-related parameters. In some embodiments, the consideration of "best-fit" may be based on closest match that does not exceed a given parameter. In other embodiments, the consider of "best-fit" may additionally be based on closest match that is greater than a given parameter (which may be the same or a different parameter). In some embodiments, the consideration of "best-fit" may be made by the operator based on the parameters provided in Table 2 (e.g., the operator may review the output parameters of Table 2, review the various options for modular containers, and then pick a desired modular container). In other embodiments, the consideration of "best-fit" may additionally or alternatively be provided by the algorithm or a different algorithm (e.g., the algorithm may determine, based on data related to the various options for modular containers and the various parameters of Table 2, which modular container should be used). In this case the algorithm may autonomously begin filling/transporting/using/etc. the selected container, or the algorithm may provide an indication to the operator who then begins the process of filling/transporting/using/etc. the selected container.

It will be understood that the above description of the algorithm that may be related to Tables 1 and 2 is intended as one example of such an algorithm, and other embodiments may use an additional or alternative algorithm. In some embodiments, the algorithm may be implemented via one or more electronic devices such as a mobile phone or tablet, an electronic device of a working machine (e.g., control software of a tractor or some similar machine), a centralized electronic device at a control center in a different location than the field where the SEP is located, etc. Tables 3-8, below, provide alternative examples of parameters that may be used in conjunction with the above-described algorithm to identify the "best-fit" modular container for a given application, operation, or task.

Tables 3 and 4 show another example use case related to use of a modular container in a planting operation. The modular container in question may be similar to, for example, modular container 800a. Specifically, Table 3 depicts various input parameters that may be set (e.g., manually by an operator, semi-autonomously by an operator and some form of control algorithm, or autonomously by the control algorithm), and Table 4 depicts various capacity-related parameters of the modular container.

TABLE 3

| Input Parameters - Planting | |
| --- | --- |
| Rated Power | 11.0 Hp |
| Ground Speed | 5.50 mi/h |
| Engine Load - Planting | 70.0% |
| Engine Load - Idle | 20.0% |
| Fuel Efficiency | 20.0 hph/gal |
| DEF Rate | 2.00% |
| Area Covered Per Refill | 25.0 acres |
| Pass Width | 10.0 feet |
| Fertilizer Application Rate (e.g., a fertilizer such as urea ammonium nitrate (UAN) or some other fertilizer) | 10.0 gal/acre |
| Seeding Rate | 36,000 seeds/acre |
| Seed Density | 80,000 seeds/unit |
| Field Efficiency | 75.0% |

TABLE 4

| Modular Container Capacity - Planting | |
| --- | --- |
| Tending Interval | 18,000 s |
| Diesel Amount | 1.04 gal |
| DEF Amount | 0.0207 gal |

TABLE 4-continued

| Modular Container Capacity - Planting | |
| --- | --- |
| Fertilizer Amount | 250.0 gal |
| Seed Amount | 104.7 gal |
| Total Volume | 355.7 gal |
| Total Weight/Mass | 3,213 lb |
| Modular Container Height | 48.30 in |

Tables 5 and 6 show another example use case related to use of a modular container in a spray application. The modular container in question may be similar to, for example, modular container 500. Specifically, Table 5 depicts various input parameters that may be set (e.g., manually by an operator, semi-autonomously by an operator and some form of control algorithm, or autonomously by the control algorithm), and Table 6 depicts various capacity-related parameters of the modular container. In Table 6, it will be understood that the term "carrier" may relate to a liquid that is used to suspend an active ingredient or chemical to facilitate a spray application. Such a liquid may be, in some embodiments, water. The term "AI" may refer to an active ingredient in the spray application which may be, for example, a pesticide type chemical or some other chemical that is being sprayed by the SEP.

TABLE 5

| Input Parameters - Spray Application | |
| --- | --- |
| Rated Power | 110.0 hp |
| Ground Speed | 15.0 mi/h |
| Engine Load - Spraying | 50.0% |
| Engine Load - Idle | 20.0% |
| Fuel Efficiency | 20.0 hph/gal |
| DEF Rate | 2.00% |
| Area Covered Per Refill | 25.0 acres |
| Pass Width | 10.0 feet |
| Spray Rate | 10.0 gal/acre |
| Field Efficiency | 75.0% |

TABLE 6

| Modular Container Capacity - Spray Application | |
| --- | --- |
| Tending Interval | 6,600 s |
| Diesel Amount | 2.289 gal |
| DEF Amount | 0.046 gal |
| Carrier/AI Amount | 250.0 gal |
| Total Volume | 252.3 gal |
| Total Weight/Mass | 2,102 lb |
| Modular Container Height | 35.6 in |

Tables 7 and 8 show another example use case related to use of a modular container in a fertilization application (e.g., application of a nitrogen-based fertilizer such as UAN). The modular container in question may be similar to, for example, modular container 800a. Specifically, Table 7 depicts various input parameters that may be set (e.g., manually by an operator, semi-autonomously by an operator and some form of control algorithm, or autonomously by the control algorithm), and Table 8 depicts various capacity-related parameters of the modular container.

TABLE 7

| Input Parameters - Fertilization Application | |
| --- | --- |
| Rated Power | 110.0 hp |
| Ground Speed | 5.5 mi/h |
| Engine Load - Fertilization | 50.0% |
| Engine Load - Idle | 20.0% |
| Fuel Efficiency | 20.0 hph/gal |
| DEF Rate | 2.0% |
| Area Covered Per Refill | 10.0 acres |
| Pass Width | 10.0 feet |
| Fertilizer Application Rate | 35.0 gal/acre |
| Field Efficiency | 75.0% |

TABLE 8

| Modular Container Capacity - Fertilization Application | |
| --- | --- |
| Tending Interval | 7,200 s |
| Diesel Amount | 2.50 gal |
| DEF Amount | 0.050 gal |
| Fertilizer Amount | 250.0 gal |
| Total Volume | 353 gal |
| Total Weight/Mass | 3,728 lb |
| Modular Container Height | 47.9 in |

Figure 13:
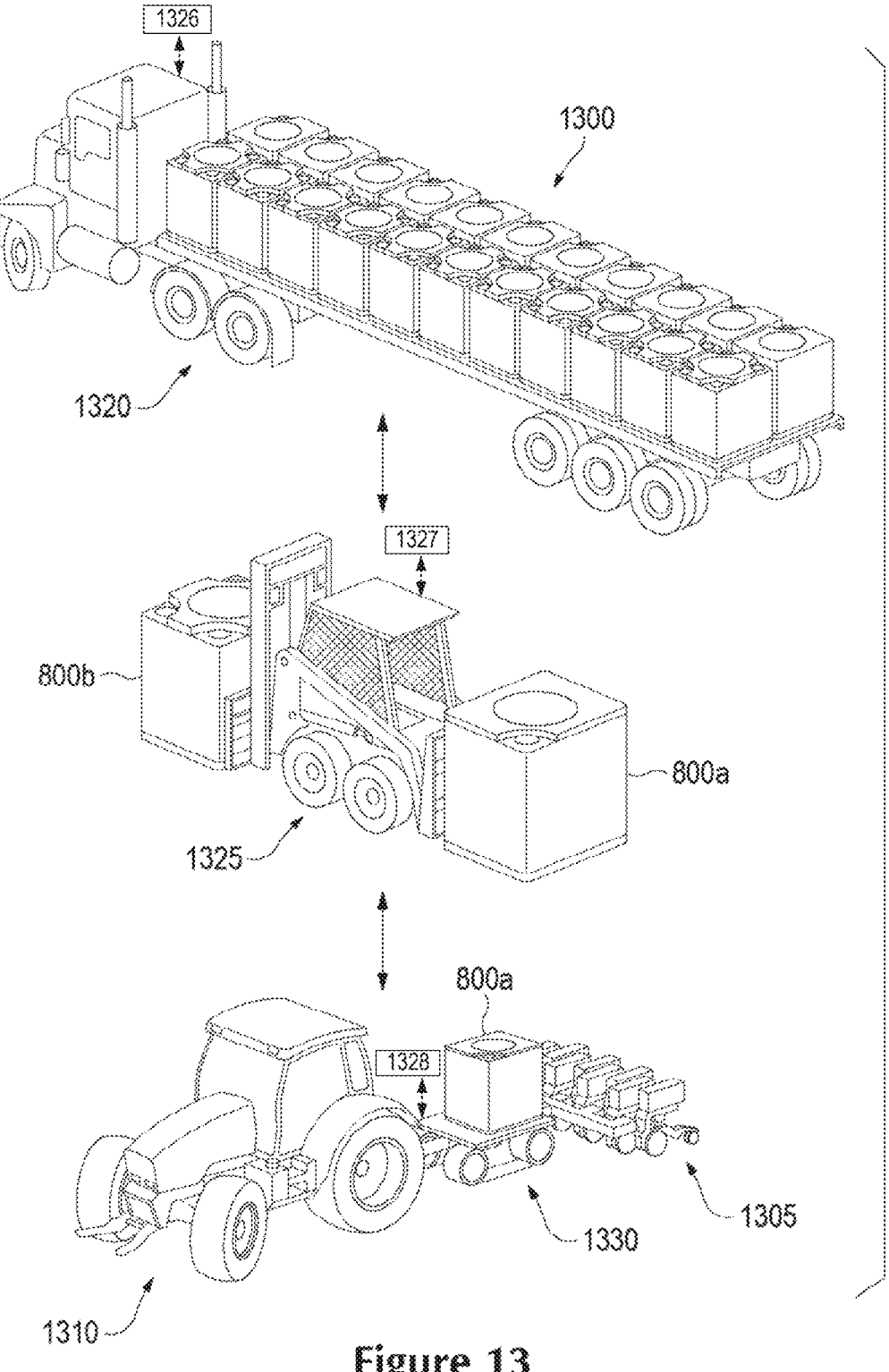
FIG. 13 illustrates an example usage of modular containers, in accordance with various embodiments.

In various embodiments, an example system that may be utilized in conjunction with one or more of the modular containers described above may include a TT, an STV, and a SEP. FIG. 13 depicts these various elements. Specifically, a TT 1320 may provide a platform to support field operations including tillage, seeding, spraying, etc. Inputs to be managed may include fuel, seed, fertilizer and spray mixtures (seed and liquid product in a modular container). In some embodiments, a TT may hold 16 full modular containers as shown at 1300. In some embodiments, the modular containers may be all of a same type (e.g., all modular containers 300, all 400, all 800a, all 800b, etc.) or may be different types of modular containers. In some examples, 16 modular containers may support approximately 400 acres of production.

In various embodiments, the system may further include an STV 1325. The STV 1325 may be used to convey full modular containers from the TT 1320 to a SEP 1330, or to convey empty modular containers from the SEP 1330 to the TT 1320. As shown in FIG. 13, in some embodiments the STV may be configured to convey a plurality of modular containers at the same time, for example modular containers 800a and 800b as shown, although in other embodiments different containers or different numbers of containers may additionally/alternatively be conveyed.

The system may further include the SEP 1340. The SEP 1330 may be configured to perform the operation, for example in an agricultural field. As described above, the operation may include or relate to planting, tillage, fertilization, spraying, or some other operation. In the specific example of FIG. 13, the SEP 1330 may include a tractor 1310, which may be manually operated, autonomous, or semi-autonomous. The SEP 1310 may be coupled with a tillage tool 1305, and convey modular container 800a. In this embodiment, the container 800a may provide inputs to the tillage operation being performed by the SEP 1330. It will be recognized, however, that in other embodiments the specific configuration or specific elements of the SEP 1330 may vary based on the operation being performed. It will further be recognized that embodiments herein are described with respect to agricultural operations, but embodiments may also be applied to other types of operations or tasks such as residential operation, commercial operation, or industrial operation as described above.

In view of the many possible embodiments to which the principles of the disclosed technology may be applied, it should be recognized that the illustrated embodiments are only preferred examples and should not be taken as limiting the scope of the disclosure.

The invention claimed is:

1. A modular container for use by a small equipment platform (SEP) in a partially or fully automated agricultural application, the modular container comprising:
   a liquid-holding portion configured to store a first liquid related to an agricultural application;
   an add-on portion that is coupled with the liquid-holding portion, the add-on portion configured to store a second liquid related to the agricultural application;
   a solid-holding portion configured to store a granular solid related to the agricultural application, the granular solid is prevented from intermixing with the first liquid while stored in the modular container;
   a first port coupled with the liquid-holding portion, wherein the first port is selectively operable to allow the first liquid to flow from the liquid-holding portion during execution of the agricultural application; and
   a second port coupled with the solid-holding portion, wherein the second port is selectively operable to allow the granular solid to flow from the solid-holding portion during execution of the agricultural application.

2. The modular container of claim 1, wherein the add-on portion is coupled with the liquid-holding portion at a side of the liquid-holding portion that is opposite a side of the liquid-holding portion that is to couple with the SEP during execution of the agricultural application.

3. The modular container of claim 1, wherein the add-on portion has a shape such that, when the add-on portion is coupled with the liquid-holding portion, the add-on portion does not prevent access by an operator of the SEP to a lid of the solid-holding portion or a plug of the liquid-holding portion.

4. The modular container of claim 1, wherein the liquid-holding portion further includes:
   a third port; and
   a channel coupled with the add-on portion, the channel is configured to allow the second liquid to flow from the add-on portion to the third port;
   wherein the third port is selectively operable to allow the second liquid to flow from the add-on portion, through the channel, and from the third port during execution of the agricultural application; and
   wherein the second liquid and the first liquid do not intermix when the second liquid is in the add-on portion or the channel.

5. The modular container of claim 1, wherein a volume of the liquid-holding portion or a volume of the solid-holding portion is based on the agricultural application.

6. The modular container of claim 1, wherein the agricultural application is a fertilizing application, a planting application, a tillage application, or a spraying application.

7. The modular container of claim 1, wherein the granular solid includes seed or fertilizer.

8. The modular container of claim 1, wherein the liquid includes a diesel fuel, a diesel exhaust fluid, a fertilizer, a carrier, or a pesticide.

9. The modular container of claim 1, wherein the SEP is a tractor.

10. A multi-product management system for performing or re-supplying a partially or fully automated agricultural operation, the system comprising:
   a small equipment platform (SEP) to perform an agricultural operation in a partially or fully automated manner based at least in part on a modular container that includes a solid-holding portion to hold a granular solid related to the agricultural operation and a liquid-holding portion to hold a liquid related to the agricultural operation; and
   a satellite transfer vehicle (STV) to convey, from a tender truck (TT), a modular container to the SEP for usage in the agricultural operation in the partially or fully automated manner;
   wherein the STV or the SEP includes an auto-connect boom to transfer the modular container between the SEP and the STV.

11. The system of claim 10, wherein a volume of the liquid-holding portion or a volume of the solid-holding portion is based on the agricultural operation.

12. The system of claim 11, wherein the volume of the solid-holding portion and the volume of the liquid-holding portion are selected such that the modular container empties of the granular solid at approximately the same time as the modular container empties of the liquid during execution of the agricultural operation.

13. The system of claim 10, wherein the SEP is a tractor.

14. The system of claim 10, wherein the SEP includes an attachment structure into which the modular container is placed by the auto-connect boom during transfer of the modular container from the STV to the SEP.

15. The system of claim 10, wherein the STV is further configured to convey the modular container to the TT after use of the modular container during performance of the agricultural operation by the SEP.

16. The system of claim 10, wherein the liquid is a first liquid and wherein the modular container further comprises an add-on portion that is coupled with the liquid-holding portion;
   wherein the add-on portion is configured to store a second liquid related to the agricultural operation.

17. A multi-product management system for use in an agricultural application that is partially or fully automated, the multi-product management system comprising:
   a modular container including:
      a first liquid-holding portion configured to store a first liquid related to the agricultural application; and
      a solid-holding portion configured to store a granular solid related to the agricultural application, wherein the granular solid is prevented from intermixing with the first liquid while stored in the modular container; and
   an attachment structure configured to removably receive the modular container, the attachment structure including:
      a first port coupled with the liquid-holding portion when the modular container is seated within the attachment structure, wherein the first port is selectively operable to allow the first liquid to flow from the first liquid-holding portion during execution of the agricultural application; and
      a second port coupled with the solid-holding portion when the modular container is seated within the attachment structure, wherein the second port is selectively operable to allow the granular solid to flow from the solid-holding portion during execution of the agricultural application.

18. The multi-product management system of claim 17, wherein the modular container further includes a second liquid-holding portion configured to store a second liquid related to the agricultural application, and the attachment structure further includes a third port coupled with the second liquid-holding portion, the third port is selectively operable to allow the second liquid to flow from the second liquid-holding portion during execution of the agricultural application.

19. The multi-product management system of claim 17, wherein the attachment structure includes a seating mechanism to guide the modular container onto supports of the attachment structure.

20. The multi-product management system of claim 17, wherein the attachment structure is an element of a small equipment platform (SEP).

\* \* \* \* \*